United States Patent [19]

Kimura

[11] Patent Number: 4,689,730
[45] Date of Patent: Aug. 25, 1987

[54] FLYBACK TRANSFORMER CIRCUIT WITH A NOISE CANCELLING CIRCUIT

[75] Inventor: Satoshi Kimura, Iwai, Japan

[73] Assignee: Victor Company of Japan, Ltd., Yokohama, Japan

[21] Appl. No.: 848,189

[22] Filed: Apr. 4, 1986

[30] Foreign Application Priority Data

Apr. 5, 1985 [JP] Japan .................................. 60-72313
Apr. 10, 1985 [JP] Japan ............................ 60-53471[U]

[51] Int. Cl.$^4$ ...................... H02M 3/355; H04N 5/63; H01J 29/70
[52] U.S. Cl. ........................................ 363/21; 363/45; 315/411; 358/190
[58] Field of Search ...................... 363/21, 45, 46, 47, 363/48; 315/411; 358/190

[56] References Cited

U.S. PATENT DOCUMENTS 4,531,181 7/1985 Herz et al. ............................ 363/21

Primary Examiner—Patrick R. Salce
Assistant Examiner—Judson H. Jones
Attorney, Agent, or Firm—Pollock, VandeSande & Priddy

[57] ABSTRACT

In a flyback transformer circuit for a cathode-ray tube of the type arranged such that secondary windings of the flyback transformer are isolated from an a.c. power source, a positive terminal of at least one secondary winding of the flyback transformer is connected via a capacitor or a series circuit of a capacitor and a parallel circuit of a resistor and a coil to a terminal which is coupled with the commercial a.c. power source via low impedance in connection with high frequency. With the provision of the capacitor or the series circuit including the capacitor, the potential at the positive terminal of the secondary winding is made equal to that at the commercial a.c. power source in connection with high frequency components, and thus the flyback pulse appearing at the positive terminal of the secondary winding has the same polarity and substantially the same peak value as that appearing at the above-mentioned terminal. As a result noise caused from flyback pulses is effectively prevented from entering the ground line or earth to avoid undesirable phenomena caused from such noise.

5 Claims, 3 Drawing Figures

FLYBACK TRANSFORMER CIRCUIT WITH A NOISE CANCELLING CIRCUIT

BACKGROUND OF THE INVENTION

1. Field of the Invention

This invention relates generally to flyback transformer circuits used for a CRT (cathode ray tube), and particularly to such a circuit arranged to supply signal processing circuits with d.c. power obtained from additional winding or windings of a flyback transformer.

2. Prior Art

In a display apparatus or unit using a cathode ray tube, such as a television set or monitor display, which can be connected to various external apparatus, the power source which supplies the video and/or audio signal processing circuits or an interface to be connected to such an external apparatus should be isolated from a commercial a.c. power source.

Conventionally, a flyback transformer is used for effecting such isolation such that various pulse voltages obtained from one or more secondary windings of a flyback transformer are rectified and smoothed to be converted into a d.c. voltage which is then supplied to one or more signal processing circuits or interface. In such an arrangement, a high voltage secondary winding used for developing a high voltage to be fed to the anode of a CRT should also be isolated from the commercial a.c. power source unless the video signal processing circuit is isolated from CRT drive circuits connected to electron guns of the CRT. In such an arrangement of a flyback transformer whose high voltage secondary winding is isolated from the a.c. power source, flyback pulses applied to the primary winding of the flyback transformer are apt to enter the video and audio signal processing circuit as well as to external apparatus via the ground line because the ground line of a horizontal output circuit connected to the primary winding is coupled via a capacitor with ground lines of the video and audio signal processing circuits or interface and external circuits. As a result, pulse like noise caused from the flyback pulses enters into video and audio signal circuits located at the secondary winding side of the flyback transformer as well as one or more external apparatus connected to the flyback transformer circuit, to cause these circuits to malfunction or to suffer from noise in video and/or audio signals.

Especially, in the case of external apparatus, such as a video tape recorder, which is not synchronized with horizontal sync in the horizontal output circuit, pulse like noise caused from flyback pulses is apt to appear in a picture on the CRT screen.

SUMMARY OF THE INVENTION

The present invention has been developed in order to remove the above-described drawbacks inherent to the conventional flyback transformer circuit of a CRT of the type arranged to produce d.c. voltage(s) using output voltages from a flyback transformer.

It is, therefore, an object of the present invention to provide a new and useful flyback transformer circuit which prevents flyback pulses from entering into the secondary circuits or external apparatus connected to the flyback transformer circuit.

According to a feature of the present invention, a positive terminal of at least one secondary winding of a flyback transformer is connected via a capacitor or a series circuit of a capacitor and a parallel circuit of a resistor and a coil to a terminal which is coupled with a commercial a.c. power source via low impedance in connection with high frequency. With the provision of the capacitor or the series circuit including the capacitor, the potential at the positive terminal of the secondary winding is made equal to that at the commercial a.c. power source in connection with high frequency components, and thus the flyback pulse appearing at the positive terminal of the secondary winding has the same polarity and substantially the same peak value as that appearing at the above-mentioned terminal. As a result noise caused from flyback pulses is effectively prevented from entering the ground line or earth, thereby avoiding undesirable phenomena caused from such noise.

In accordance with the present invention, there is provided a flyback transformer circuit for a CRT, comprising: rectifying means responsive to a commercial a.c. power source for producing a d.c. voltage; a horizontal output circuit responsive to horizontal drive pulses, said horizontal output circuit being connected to a horizontal deflecting yoke of said CRT; a flyback transformer having a primary winding connected to said horizontal output circuit and arranged to receive said d.c. voltage, a high voltage secondary winding to be connected to said CRT, and at least one additional secondary winding for developing a voltage which is used as a power source of secondary circuits and/or external apparatus; and a capacitor interposed between a positive terminal of said additional secondary winding or said high voltage secondary winding and a terminal of said commercial a.c. power source, rectifying means, horizontal output circuit or flyback transformer, which terminal is coupled with said commercial a.c. power source via low impedance in connection with high frequency.

In accordance with the present invention, there is also provided a flyback transformer circuit for a CRT, comprising: a rectifying means responsive to a commercial a.c. power source for producing a d.c. voltage; a horizontal output circuit responsive to horizontal drive pulses, said horizontal output circuit being connected to a horizontal deflecting yoke of said CRT; a flyback transformer having a primary winding connected to said horizontal output circuit and arranged to receive said d.c. voltage, a high voltage secondary winding to be connected to said CRT, and at least one additional secondary winding for developing a voltage which is used as a power source of secondary circuits and/or external apparatus; and a series circuit of a capacitor and a parallel circuit of a resistor and a coil, said series circuit being interposed between a positive terminal of said additional secondary winding or said high voltage secondary winding and a terminal of said commercial a.c. power source, rectifying means, a horizontal output circuit or flyback transformer, which terminal is coupled with said commercial a.c. power source via low impedance in connection with high frequency.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated with like reference numerals throughout the drawings.

DETAILED DESCRIPTION OF THE INVENTION

Prior to describing preferred embodiments of the present invention, a conventional circuit arrangement will be discussed with reference to FIG. 3 for a better understanding of the present invention.

Figure 3:
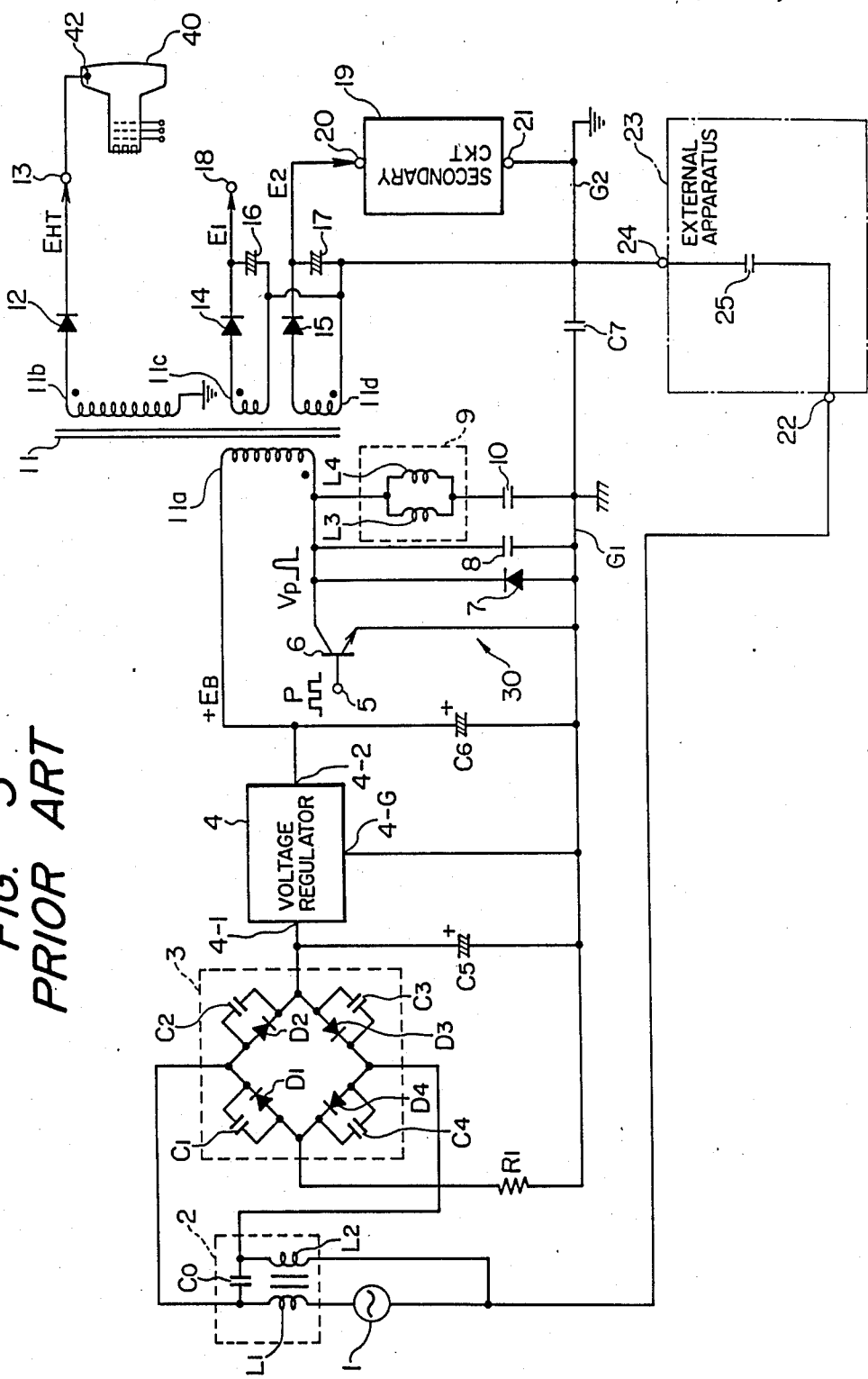
FIG. 3 is a diagram showing a conventional flyback transformer circuit.

FIG. 3 is a diagram showing a conventional flyback transformer circuit used for a CRT of a television or monitor display. In FIG. 3, a commercial a.c. power source 1 is connected via a filter 2 having two coils L1 and L2 and a capacitor Co to a diode bridge circuit 3 having four diodes D1 to D4 and noise suppressing capacitors C1 to C4 each connected in parallel with each diode. This diode bridge 3 constitutes a full-wave rectifying circuit whose one output terminal is connected to an input terminal 4-1 of a voltage regulator 4 for a horizontal output circuit 30. The other output terminal of the full-wave rectifying circuit 3 is connected via a resistor R1 to ground, while a smoothing capacitor C5 is connected between the two output terminals of the full-wave rectifying circuit 3. Another smoothing capacitor C6 is connected between an output terminal 4-2 of the voltage regulator 4 and ground to which a ground terminal 4-G of the voltage regulator 4 is connected. A given d.c. voltage $+E_B$ is developed at the output terminal 4-2 of the voltage regulator 4 which is connected to a negative terminal of a primary winding 11a of a flyback or horizontal output transformer 11.

The horizontal output circuit 30 comprises a horizontal output transistor 6, which turns on and off in response to horizontal drive pulses P fed through a terminal 5 from an unshown horizontal drive circuit, a damper diode 7, a flyback resonance capacitor 8, a deflecting yoke 9 having a parallel circuit of a pair of coils L3 and L4, and an S correction capacitor 10. The collector of the horizontal output transistor 6 is connected to a positive terminal of the primary winding 11a of the flyback transformer 11. In the drawings, the positive terminal of each winding is denoted by a dot. It is to be noted that the term "positive terminal" of any of secondary windings 11b, 11c and 11d, which will be described hereinlater, is used to indicate a terminal of a secondary winding at which a positive-going pulse is developed relative to the other terminal, i.e. negative terminal, of the same secondary winding when a positive-going pulse is applied to the positive terminal of the primary winding 11a. To make this clear, signal waveforms are additionally illustrated in FIG. 1.

As is well known, when the horizontal output transistor 6 turns on and off in response to the horizontal drive pulses P having a horizontal scanning frequency, sawtooth wave currents flow via the pair of coils L3 and L4 of the deflecting yoke 9. The aforementioned given d.c. voltage $+E_B$ is fed from the voltage regulator 4 via the primary winding 11a of the flyback transformer 11 to the horizontal output circuit.

A flyback pulse Vp occurring at the collector of the horizontal output transistor 6 when the transistor 6 is in off state, is boosted by a high voltage secondary winding 11b so that a high voltage $E_{HT}$ is taken out via a rectifying diode 12 to be fed via an output terminal 13 to an anode 42 of a CRT 40. The flyback pulse Vp applied to the primary winding 11a is also taken out from other or additional secondary windings 11c and 11d after being boosted to be respectively outputted as d.c. voltages E1 and E2 via rectifying diodes 14 and 15, and smoothing capacitors 16 and 17, to be fed to an output terminal 18 and a terminal 20 of a secondary circuit 19. The secondary circuit 19 may be video and audio signal processing circuits which should be isolated from the commercial a.c. power source. In other words, the secondary circuits 19 correspond to so called cold circuits, while circuits connected in connection with a.c. to the commercial a.c. power source 1 are so called hot circuits.

The smoothing capacitors 16 and 17 are grounded at one of their terminals while the secondary circuit 19 is also grounded at its terminal 21. It is to be noted that ground or ground line G1 of the horizontal output circuit positioned at the left side of the flyback transformer 11 in the illustration is not directly connected to ground or ground line G2 to which the secondary circuit 19 is connected. These two ground lines G1 and G2 are coupled via a coupling capacitor C7. Since the ground line G1 is substantially coupled with one terminal of the commercial a.c. power source 1 via a low impedance, the smoothing capacitors 16 and 17 as well as the secondary circuit 19 are regarded as being grounded or connected to earth via the coupling capacitor C7. In the above, the word "earth" is used to mean earth or ground line of the commercial a.c. power source line, whereas the word, "ground line" is used to mean a common line or terminal within a limited circuit. Similarly, ground terminal 24 of an external apparatus 23, such as a video tape recorder, is connected to the ground line G1 to be grounded via the coupling capacitor C7. In addition, a noise suppressing capacitor 25 is interposed between the ground terminal 24 and another terminal 22 which is connected to the commercial a.c. power source 1 in turn. An a.c. power supply to the external apparatus 23 is not shown for simplicity. However, it should be appreciated that external apparatus 23 may be supplied with rectified a.c. power from terminal 18.

The above-mentioned coupling capacitor C7 is provided for balancing the potential at the primary circuit (horizontal output circuit) and the secondary circuit 19 so that the primary and secondary circuits are rendered at equal potential in connection with high frequency, i.e. horizontal scanning frequency or higher. More particularly, since the frequency of flyback pulses is approximately five times the horizontal scanning frequency, the above-mentioned high frequency may be around 80 kHz when the horizontal scanning frequency is 15.75 kHz. However, flyback pulses at the primary circuit are apt to enter into the secondary circuit 19 via the first and second ground lines G1 and G2 because the primary and the secondary circuits 19 are electrically coupled via distributed capacitors between the primary and secondary windings 11a, 11b, 11c and 11d the flyback transformer 11 and the coupling capacitor C7.

More specifically, energy is stored in the deflecting yoke 9 during a period where the horizontal output transistor 6 is in on state, and the stored energy is fed to the flyback resonance capacitor 8 to charge the same during a period where the transistor 6 is in off state. In addition, the energy stored in the deflecting yoke 9 flows via the coupling capacitor C7 and/or other coupling capacitors between the primary circuit and the secondary circuit of the flyback transformer 11 and unshown printed circuit board into ground lines G1 and G2. Such flow of energy is effected directly when an antenna input circuit is provided in the secondary circuit 19 where one terminal of an antenna input cable is connected to earth or the first ground line G1. Furthermore, in the case of the external apparatus 23, such energy flows via the noise suppressing capacitor 25 to the first ground line G1.

For the above reason, flyback pulses having horizontal sweep frequency leak to the secondary circuit 19 and/or the external apparatus 23 as pulse like noise which is apt to cause these circuits or apparatus to malfunction or to suffer from video and audio noise.

Figure 1:
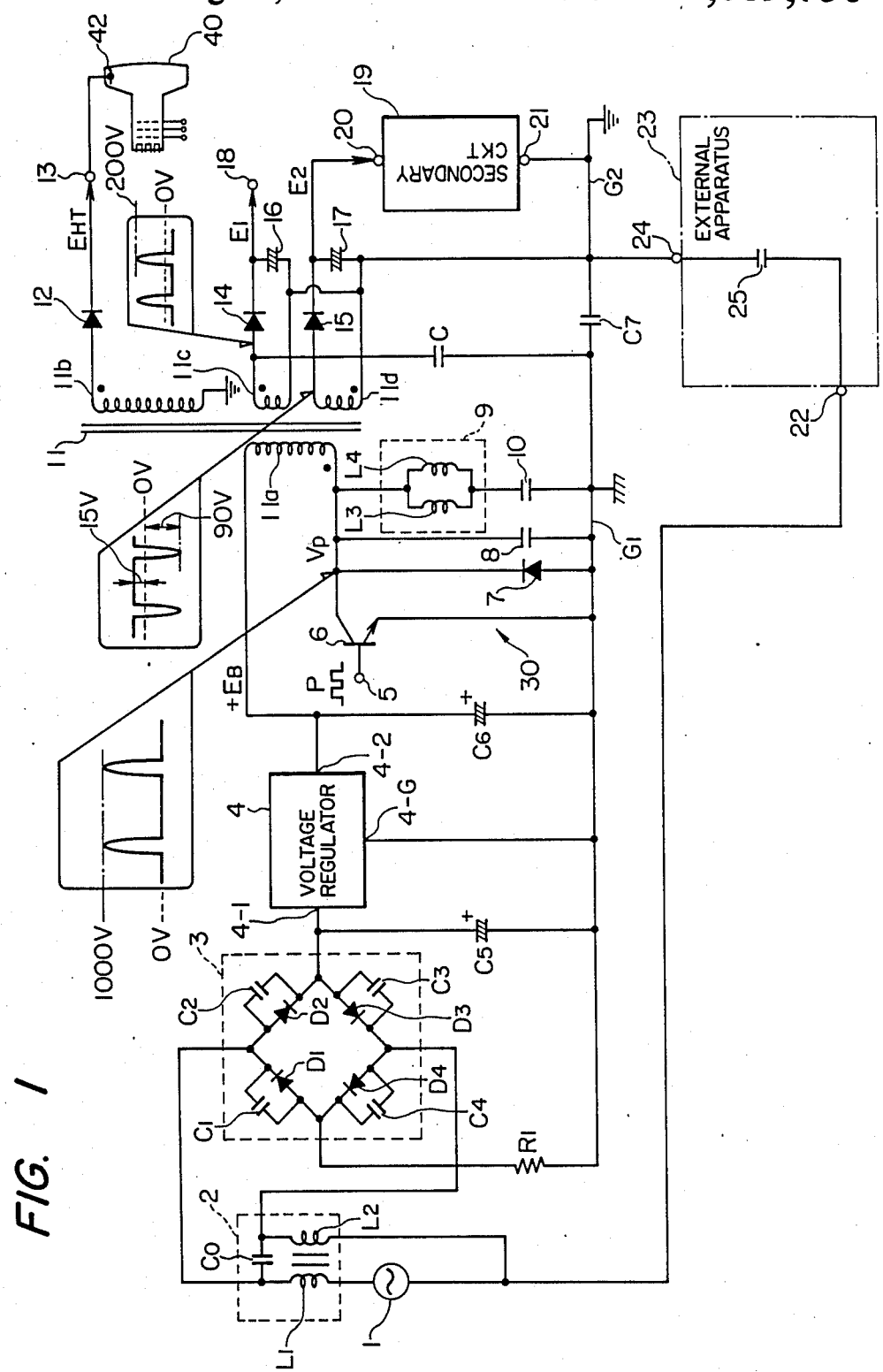
FIG. 1 is a schematic diagram showing a first embodiment of the flyback transformer circuit according to the present invention.

Reference is now made to FIG. 1 showing a first embodiment of a flyback transformer circuit according to the present invention.

The first embodiment flyback transformer circuit generally comprises a full-wave rectifier 3 connected via a filter circuit 2 to a commercial a.c. power source, a voltage regulator 4, a horizontal output circuit 30, and a flyback transformer 11 in the same manner as in the conventional flyback transformer circuit of FIG. 3. The first embodiment flyback transformer circuit differs from the conventional arrangement in that the coupling capacitor C7 is provided for interconnecting first ground line G1 of the primary circuit and the second ground line G2 of the secondary circuit 19 and in that a capacitor C is newly provided between a positive terminal of one of the secondary windings 11b and 11c and the first ground line G1. In the illustrated embodiment, the capacitor C is connected to a positive terminal of one (11c) of the two secondary windings 11b and 11c. Since the positive terminal of additional secondary winding 11d is grounded or connected to the second ground line G2, the capacitor C cannot be connected thereto. As will be described hereinafter in detail, this newly provided capacitor C is used for suppressing undesirable pulse like noise caused from leakage of flyback pulses. The value of the capacitor C depends on the secondary circuit 19. In other words, the capacitance of the capacitor C may be changed, depending on the voltage developed across the secondary winding to which the capacitor C is connected. For instance, when the capacitor C is connected to a secondary winding used for a power source of a heater of a CRT, whose peak to peak voltage is approximately 30 volts, the capacitor C may be approximately 2000 pF. In the case that the capacitor C is connected to 200 V (peak to peak) terminal of the secondary winding 11d as shown in FIG. 1, the capacitor C may be 200 to 600 pF. Furthermore, in the case that the capacitor C is connected to the high voltage secondary winding 11a, the capacitor C may be several pF. The value of the capacitor C is preferably changed depending on the values of the capacitor Co of the filter 2, the capacitors C1 to C4 of the full-wave rectifying circuit 3 and the distributed capacitor between the primary and secondary windings 11a, 11b, 11c and 11d of the flyback transformer 11.

As the capacitor C is connected between the positive terminal of the secondary winding 11c and the first ground line G1 of the primary circuit, the potentials at both terminals of the capacitor C are rendered equal to each other in connection with a high frequency, which is approximately five times the horizontal scanning frequency. As a result flyback pulses are prevented from flowing into ground line or earth. Therefore, pulse like noise caused from flyback pulses does not occur in the secondary circuit 19 or in the external apparatus 23. Furthermore, since no flyback pulses enter the first ground line G1 or earth, spurious radiation of pulse components from the commercial a.c. power source line is also prevented.

Figure 2:
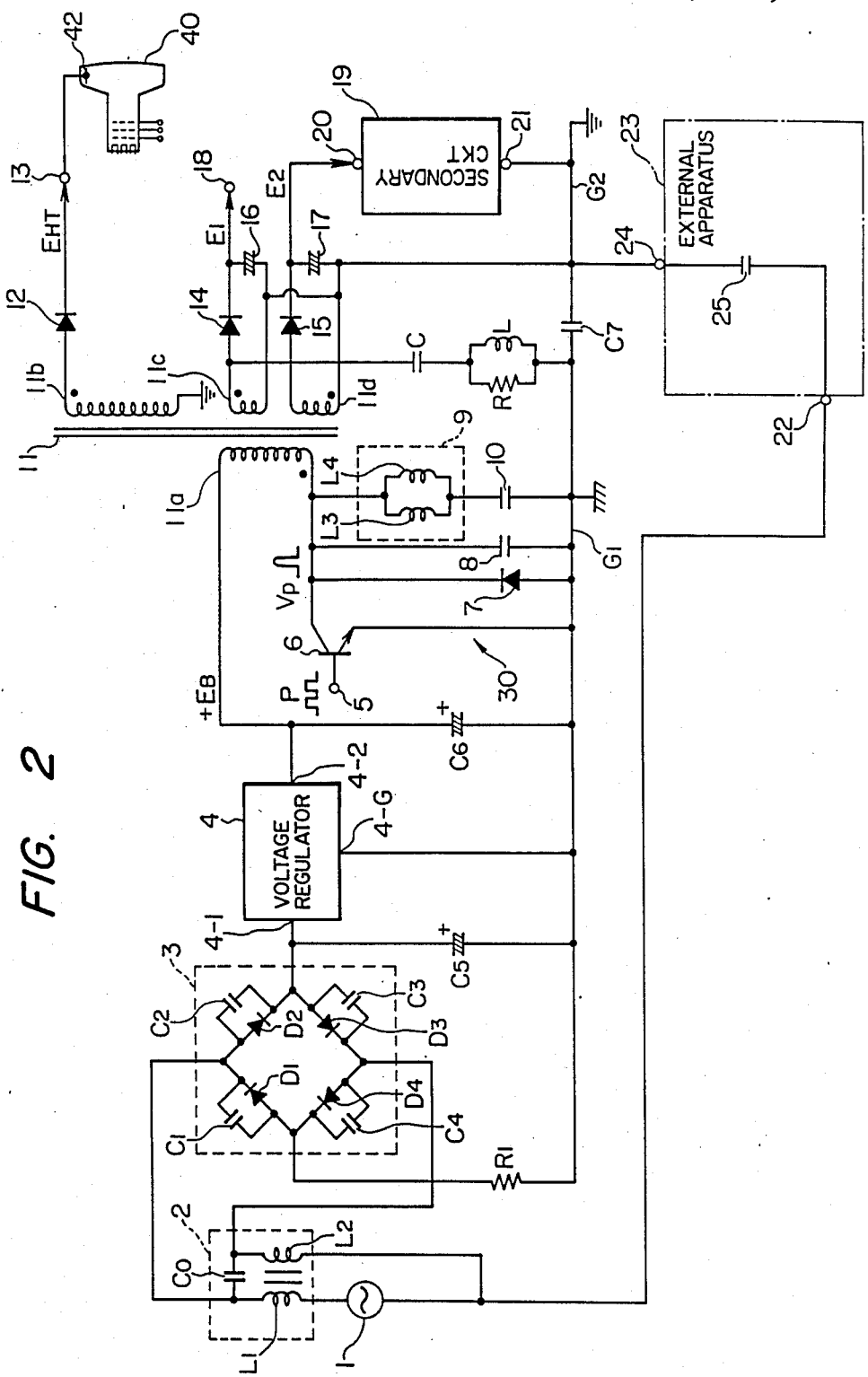
FIG. 2 is a schematic diagram showing a second embodiment of the flyback transformer circuit according to the present invention.

FIG. 2 shows a second embodiment or a modification of the first embodiment flyback transformer circuit of FIG. 1. The second embodiment differs from the first embodiment in that a parallel circuit of a resistor R and a coil L is also used in addition to the capacitor C. More specifically, the parallel circuit of the resistor R and the coil L is connected in series with the capacitor C so that the series circuit of the capacitor C and the parallel circuit of the resistor R and the coil L is interposed between the positive terminal of the secondary winding 11c and first ground line G1 of the primary circuit. In FIG. 2, the coupling capacitor C7 also shown in FIG. 3 is used. This coupling capacitor C7 may be omitted if desired in the same manner as in the first embodiment.

The second embodiment circuit arrangement is useful when the flyback pulse is relatively distorted to include harmonics. More specifically, high frequency components whose frequency is higher than flyback pulses are effectively blocked by the coil L and thus horizontal ringing appearing on a CRT screen is avoided, while spurious radiation from the commercial a.c. line is reduced. The resistor R connected in parallel with the coil L is a damping resistor.

The value of the capacitor C may be changed in the same manner as in the first embodiment.

In the above-described first and second embodiments, although the capacitor C or the series circuit of the capacitor C and the parallel circuit of the resistor R and the coil L is shown to be connected to the first ground line G1 of the primary circuit, it may also be connected to the positive terminal of the primary winding 11a of the flyback transformer 11, rather than to the first ground line G1. In other words, it is necessary only to connect the capacitor C or the series circuit is necessary to be connected to a terminal of the commercial a.c. power source 1, rectifying circuit 3, horizontal output circuit 30 or flyback transformer, which terminal is coupled with the commercial a.c. power source via low impedance in connection with high frequency.

The above-described embodiments are just examples of the present invention, and therefore, it will be apparent for those skilled in the art that many modifications and variations may be made without departing from the scope of the present invention.

What is claimed is:

1. A flyback transformer circuit for a CRT, comprising:
    (a) rectifying means responsive to commercial a.c. power source for producing a d.c. voltage;
    (b) a horizontal output circuit responsive to horizontal drive pulses;
    (c) a flyback transformer having a primary winding connected to said horizontal output circuit and arranged to receive said d.c. voltage, a high voltage secondary winding to be connected to said CRT, and at least one additional secondary winding for developing a voltage which is used as a power source of secondary circuits, said voltage usable by external apparatus; and
    (d) a capacitor having one end directly connected to a positive terminal of one of said secondary windings and the other end connected to a terminal which is coupled with said commercial a.c. power source via low impedance in connection with high frequency.

2. A flyback transformer circuit as claimed in claim 1, wherein said capacitor has a value so that a flyback pulse appearing at said positive terminal of said one of said secondary windings is of the same polarity and substantially the same peak value as that appearing at said terminal.

3. A flyback transformer circuit for a CRT, comprising:
   (a) rectifying means responsive to commercial a.c. power source for producing a d.c. voltage;
   (b) a horizontal output circuit responsive to horizontal drive pulses, said horizontal output circuit being connected to a horizontal deflecting yoke of said CRT;
   (c) a flyback transformer having a primary winding connected to said horizontal output circuit and arranged to receive said d.c. voltage, a high voltage secondary winding to be connected to said CRT, and at least one additional secondary winding for developing a voltage which is used as a power source of secondary circuits, said voltage usable by external apparatus; and
   (d) a series circuit of a capacitor and a parallel circuit of a resistor and a coil, said series circuit being interposed between a positive terminal of one of said secondary windings and a terminal which is coupled with said commercial a.c. power source via low impedance in connection with high frequency.

4. A flyback transformer circuit as claimed in claim 3, wherein said capacitor has a value so that a flyback pulse appearing at said positive terminal of said one of said secondary windings is of the same polarity and substantially the same peak value as that appearing at said terminal.

5. A flyback transformer circuit as claimed in claim 3, wherein said coil has an inductance so that components whose frequency is higher than flyback pulses are effectively blocked.

* * * * *